UNITED STATES PATENT OFFICE.

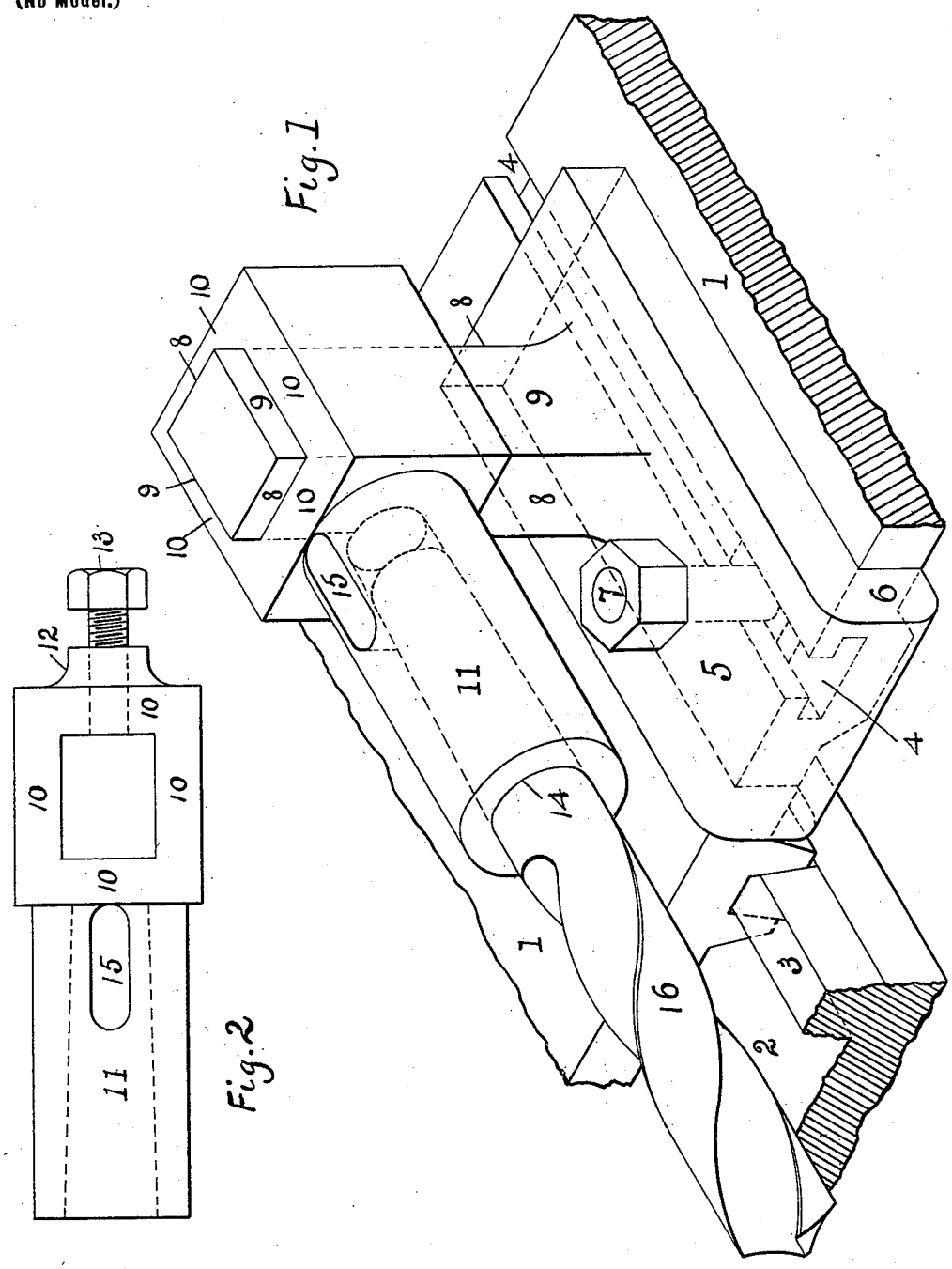

BERNARD O. BREITFIELD, OF PHILADELPHIA, PENNSYLVANIA.

BORING-TOOL HOLDER.

SPECIFICATION forming part of Letters Patent No. 680,425, dated August 13, 1901.

Application filed April 19, 1901. Serial No. 56,560. (No model.)

*To all whom it may concern:*

Be it known that I, BERNARD O. BREITFIELD, a citizen of Germany, residing at Philadelphia, in the county of Philadelphia and State of Pennsylvania, have invented certain new and useful Improvements in Boring-Tool Holders, of which the following is a specification.

The object of my invention is to provide attachments for engine-lathes whereby the appliances for boring and drilling by such machines shall be secured to the slide-rest of the machine in manner to be fed by the slide-rest's feed mechanism and be firmly and truly secured in position for its work without deviation from proper alinement. Heretofore it has been the practice to insert the drilling or boring tool in the lathe's live-spindle, and the object to be drilled or bored was fixed upon the slide-rest and fed toward the drilling or boring tool by the sliding head-spindle, which must be hand-operated. This method not only makes it necessary for the attendant to give the work of one lathe undivided attention, but also results in the loss of much time in securing the object to be worked to the slide-rest, also the removal and securing of successive objects, and the liability of spoiled work through inaccuracies in setting the work and in properly guiding the boring or drilling tool. With my invention the boring or drilling tool is securely and accurately held on the slide-rest and is machine-fed to the work, which is held in a quick-grip and quick-release chuck on the lathe's face-plate and revolves therewith, the work revolving and the boring or drilling tool non-revolving, and the attendant instead of employing his whole time at one lathe can attend several, as his only attention is to chuck the pieces to be bored or drilled and start the power feed mechanism. The machine automatically does the rest, and several other machines may be attended before he is again required at the first machine, the interval of time depending, of course, upon the distance to be bored or drilled in each successive piece, but in duplicate work a great saving of time and labor is made and more accurate work insured.

My mechanism is illustrated in the accompanying drawings, in which—

Figure 1 is an isometrical view of my improvement with the parts attached as in operation. Fig. 2 is a top view of the boring or drilling tool holder.

Similar figures of reference indicate similar parts throughout the views.

In Fig. 1 is seen a portion of a slide-rest 1 of a lathe which extends across the lathe bed or shears 2, a portion of which is shown, with one of the V's 3, by which the slide-rest is guided on the bed. The slide-rest has a T-section slot 4, by which the usual tool-post for turning tools is held and which I utilize for my invention.

The above is the plain slide-rest, and where compound rests are in use my appliances can be equally well adapted.

The usual lathe attachments of fixed head and its live-spindle and face-plate at one end of the bed and the movable head with its spindle and hand-wheel at the other end of the bed, between which the slide-rest moves, together with the feed mechanism to move the slide-rest on the bed, are not shown, as these parts are all old and well known and their illustration is not essential to a full comprehension of my invention, its application, and advantages.

Upon slide-rest 1 I place a plate 5 at the transverse center of the lathe-bed, (the slide-rest being moved to suit such position,) and at the fixed head side of the rest form a downward projection 6, which abuts the slide-rest to cause plate 5 to move with the rest when held to place by bolt 7. Standing upright from plate 5 is a rectangular section-post, having its short sides 8 in line transverse to the center of the lathe and its long sides 9 parallel thereto. Snugly but movably fitting sides 8 9 is the rectangular socket of the tool-holder, composed of walls 10, joined to a circular section part 11, in which is a tapered hole 14 to receive the boring or drilling tool. A hub or boss 12 is formed on the rectangular socket's back wall, and it is tapped to receive a set-screw 13, which secures the holder in place on the post. At the small end of the tapered hole or socket 14 is a vertical hole 15, through which a drift is inserted and driven against the tool 16 when it is to be removed. When small tools are to be used, a chuck can be inserted in socket 14, whereby they may be held.

I claim—

1. In a tool-holder, a rectangular post and means to secure it to a slide-rest, a removable tool-holder having a rectangular socket adapted to be adjustably secured to the rectangular post aforesaid, and a circular section part adjoining the rectangular part, taper-bored, and adapted to hold the boring or drilling tools inserted therein.

2. In a tool-holder, a rectangular post having its elongated sides in parallel alinement with the center of the machine it is used on, means to secure the post for movement with a slide-rest, a tool-holder having a socket wherein a boring-tool is held, a rectangular part adjoining the circular section part and fitting around the rectangular post, and means to secure it to the tool-post at a desired height.

In testimony whereof I affix my signature in presence of two witnesses.

BERNARD O. BREITFIELD.

Witnesses:
W. H. ALCOCK,
R. C. WRIGHT.